United States Patent [19]

Reiner et al.

[11] Patent Number: 5,691,932
[45] Date of Patent: Nov. 25, 1997

[54] CARE GIVER DATA COLLECTION AND REMINDER SYSTEM

[76] Inventors: Nobert Leo Reiner, 21 Blakeslee Rd., Wallingsford, Conn. 06492; Helaine Reiner Fischer, 5 Lancelot Way, Hamden, Conn. 06518

[21] Appl. No.: 710,667

[22] Filed: Sep. 18, 1996

[51] Int. Cl.⁶ .............................. G04B 47/00; A61B 5/04; G09G 5/00
[52] U.S. Cl. .................... 368/10; 128/710; 340/309.4; 345/156
[58] Field of Search .................... 368/10, 41, 43, 368/82, 223, 239; 128/709, 710; 221/2, 3, 15; 364/569; 340/309.4; 345/1, 156

[56] References Cited

U.S. PATENT DOCUMENTS

| | | | |
|---|---|---|---|
| 4,490,711 | 12/1984 | Johnston | 368/10 |
| 4,588,303 | 5/1986 | Wirtschafer | 368/10 |
| 4,715,385 | 12/1987 | Cudahy et al. | 128/710 |
| 4,853,844 | 8/1989 | Kono | 395/500 |
| 4,905,213 | 2/1990 | Masse | 368/10 |
| 4,972,391 | 11/1990 | Juve | 368/10 |
| 4,975,842 | 12/1990 | Darren et al. | 128/630 |
| 5,088,056 | 2/1992 | McIntosh | 364/569 |
| 5,088,070 | 2/1992 | Shiff | 368/10 |
| 5,097,429 | 3/1992 | Woos et al. | 364/569 |
| 5,099,463 | 3/1992 | Lloyd et al. | 368/10 |
| 5,157,640 | 10/1992 | Backner | 368/10 |
| 5,291,399 | 3/1994 | Chaco | 395/203 |
| 5,307,263 | 4/1994 | Brown | 364/413.09 |
| 5,337,290 | 8/1994 | Ventimiglia | 368/10 |
| 5,365,496 | 11/1994 | Tolan-Samilow | 368/10 |
| 5,408,443 | 4/1995 | Weinberger | 368/10 |
| 5,495,961 | 3/1996 | Maestle | 221/3 |

*Primary Examiner*—Vit W. Miska
*Attorney, Agent, or Firm*—Jonathan E. Grant

[57] ABSTRACT

A care giver data collection and events reminder system for an infant. The device is used to collect data for parents, hospitals, pediatricians, or care givers. Information such as feeding times, measurable amounts of consumption or discharge, bowel movements, medications, shots, first words, walking, apgar, growth chart, last appointment, allergies or allergic reactions to medications, and the like are stored in the system's memory. The storage may be non-volatile or volatile with a battery back-up. The stored data is used to provide reminders to the care giver. These timed reminders include the next time medication is to be administered, the feeding schedule, the times between last bowel movement and when the next doctor appointment should occur. A schedule of appropriate events and the times, as they are to occur, are set within the device. Icons are used to assist in international use of the device and to simplify the operation of the device. A case is used to store and transport the present invention. Alternate embodiments provide for uploading/downloading data and information from the present invention.

20 Claims, 7 Drawing Sheets

CARE GIVER DATA COLLECTION AND REMINDER SYSTEM

FIELD OF THE INVENTION

The invention generally relates to computerized data collection devices, event timers, and care giver (operator reminder) devices for infants. Particularly, the current invention relates to a computer operated device that provides a means for storing related information pertaining to a child during their early developmental years and allowing one or a number of care givers to have access to the information and provide reminders at specified times to those care givers.

BACKGROUND OF THE INVENTION

Over the years, care givers have been faced with the task of remembering every detail of a child's biological activities, medications and doctor appointments. Frequently, more than one caregiver is involved in a child's life. Further, many families have a number of children, within the same age range. This can make tracking their childrens' information very difficult.

When a child is taken to the doctor's office, the parents are asked a number of standard questions. The answers to these questions dictate the path the doctor will take in caring for the child. Usually, these questions should be easily answered; however, parents often have difficulty remembering certain physiological events of their child. Furthermore, if a child is cared for by a number of people, the information may be distorted or forgotten. Even when the parents are at home full time with the child it is difficult to recall every detail and all of the child's actions.

There is a need for a data collection and reminder device providing for the specific needs of children in these important and quickly changing years of development. Care givers at home, in hospitals, orphanages, and day case environments can benefit from the present invention. The day care centers in America usually have 5–10 babies under the age of two in a single room under the care of one individual. The tracking of information is usually kept are log sheets to help the caregiver keep track of medication times, feeding, times and amounts, diaper changes, and the like. It is very difficult for the care givers to keep track of all the information, and accurately relay to the parents upon pickup of a child. Au pairs are used in many households. In many situations English is not the care giver's first language, making conveyance of information even more difficult.

DESCRIPTION OF THE PRIOR ART

Medical timers have been used to remind people to take medications and perform medical care. Various embodiments of these types of devices are disclosed in the following patents: U.S. Pat. Nos. 4,490,711 (Johnston), 4,588,303 (Wirtschafler et al.), 4,725,997 (Urguhart et al.), 4,853,854 (Behar et al.), 4,893,291 (Brick et al.), 4,905,213 (Masse et al.), 5,088,056 (McIntosh et al.), 5,088,070 (Shiff), 5,099,463 (Lloyd et al.), 5,157,640 (Buckner) and 5,408,443 (Weinberger). The differences between these types of devices and the instant invention will become apparent.

Portable medical data storage devices for patient information are disclosed in U.S. Pat. Nos. 4,715,385 (Cudaly et al.) and 5,291,399 (Chaco). These devices allow various data to be stored and then later retrieved by a medical computer system; however, they do not perform the same functions as the current invention. The use of icons and international symbols are not disclosed and do not function in the same manner.

A few devices have been directed to providing data storage and reminders for care givers. Unfortunately, they do not provide solutions to the problems facing care givers, as does the current invention.

U.S. Pat. No. 4,972,391 (Juve et al.) discloses a breast feeding timer that provides an indication of the appropriate times a child should be fed. This device includes a simple display and alarm system. The device may also be used to help remind the caregiver of times medication should be administered. The device of Juve et al. is a simple feeding timer not designed to aid in the total care of the child. Furthermore, the device does not provide the ease of use as does the present invention. Moreover, Juve et al. does not provide the means for indicating times for bottle feeding as many children may be both bottle and breast fed simultaneously.

U.S. Pat. No. 5,365,496 (Tolan-Samilow) discloses a potty trainer timepiece designed to assist in the reinforcement of times at which a child should be using a restroom or potty chair. This is simply an event counter/timer and reminder device that is not designed to perform in the manner of the instant invention. It does not store information relating to feeding, medication, and general medical history and needs, nor does it use icons or provide international use.

U.S. Pat. No. 4,975,842 (Darrow et al.) discloses a patient logging data device to track angina attacks.

U.S. Pat. No. 5,097,429 (Wood et al.) discloses a programmable event reminder apparatus to tell a person when their next dosage of medication is to be taken. Though it is user programmable and controllable, it lacks the easy user interface of the present invention and does not track all the information needed to help care for an infant. The use of icons and international symbols is not disclosed.

U.S. Pat. No. 5,495,961 (Maestre) discloses a portable programmable medication alarm device directed to medications and reminding the patient of when to take his or her medication. The device can give basic history information of taking the medication and what side effects may occur. The device may be interfaced to a doctor's computer and download the information to track how well the patient has followed the directions. The device does not disclose its use as a care giver data storage and retrieval system and reminder for infants in the fashion of the present invention. It lacks the ability to store information pertaining to the other biological functions of the child and the relative history of the child in a fashion that would be useful to a parent care giver and/or a doctor.

OBJECTS OF THE INVENTION

It is the principle object of the present invention is to provide a care giver data collection and retrieval system capable of providing for the storage and retrieval of data relating to an infant, and to provide timed reminders for the dispensing of food or medicine as well.

Another object of the invention is to provide a data collection and retrieval system using icons and intelligible symbols to allow for ease of use.

Another object of the invention is to provide a data collection and retrieval system capable of international use without modification so that non-English speaking persons can input and retrieve data.

Another object of the invention is to provide a device capable of providing information to other care givers or professional persons.

Yet another object of the invention is to provide a data collection and retrieval system providing reminders to a care giver relating to the various needs of a child.

Yet another object of the invention is to provide a device that is portable and can be easily carried with the infant or the care giver.

Yet another object of the invention is to provide a carrying case so that the device can be held within and transported with the parent and/or the care giver. The case is constructed to hold special instructions for the care giver.

A further object of the invention is to provide a portable data information device programmable to function as a storage and retrieval device and provide indications of an occurrence and the impending occurrence of an event.

It is a further object of the invention to provide a programmable device to be operated simply and to allow ease of use by many different persons.

It is yet a further object of the invention to provide a programmable device that is convenient to use by a number of care givers, thereby helping the operators to have a complete record of a child's history as well as to provide reminders, vital for an infant's care.

It is yet another object of the present invention to provide a programmable device whereby the information can be easily retrieved by a person so that proper care can be given in cases of emergency or by persons not familiar with the child.

These and other objects of the present invention will become apparent hereinafter.

SUMMARY OF THE INVENTION

These and other objects are accomplished in accordance with the present invention wherein the device provides a data storage and retrieval system using icons to prompt users. The icons are combined with international designations to allow ease of use. This will allow persons who do not speak English to use the device with ease. Further, various alarm states can be initiated by the microcontroller through the use of either a display device or an auditory signalling system. The auditory signalling system can provide either alarm signals or verbal signals. The verbal signals are in the form of English, yet could be programmed in any language.

A microcontroller is used as the central processor for the present invention. The microcontroller includes RAM and ROM as well as a number of input/output ports for data communications. These devices allow for the compact and portable design of the invention. A battery is used to power the microcontroller and related circuitry. A sleep mode may be provided to increase the life of the battery.

In one embodiment of the invention, the apparatus includes a carrying case that allow the operator to attach the device on a changing table, to their belt, refrigerator, or to carry it around the neck or wrist. This helps the operator to keep the device in an accessible and obvious place so that the operator is able to remember to enter data when required. Further, special instructions can be held in the case to help assist the care giver in remembering information. This could be similar to a prescription or a MED-ALERT card.

In accordance with another feature, as the device tracks all the major information relating to a child regarding medications, biological functions and doctor/medical information, it will assist the parents of children with special needs in keeping very accurate information. Children with conditions relating to renal or kidney disease need to be tracked regarding bowel movements and urinary voiding. Parents of children with medical conditions such as asthma, diabetes, and heart conditions need to be monitored not only regarding specific medications but also when feeding has occurred, when liquids were last given and with certain medications if bowel or urinary functions have changed. The present invention addresses all of these needs for parents and care givers, so that data can be stored and retrieved in a manner that is useful.

In accordance with even another feature, the device is designed to allow interface with a computer so that informational data can be downloaded in a quick manner into a doctor's or hospital's computer system. This will assist the medical professionals in tracking the biological functions of the child. Further, it can be used to assist in making diagnosis of a child either during a visit to a specialist, a pediatrician, or an emergency physician. In certain situations, the information may be provided in a format that assists the care giver or parent in conveying accurate information regarding a child.

BRIEF DESCRIPTION OF THE DRAWINGS

A more complete understanding of the objects of the present invention will become apparent after reading the detailed description and claims as well as taking into consideration the accompanying drawings, wherein;

DETAILED DESCRIPTION OF THE PREFERRED EMBODIMENT

Figure 1:
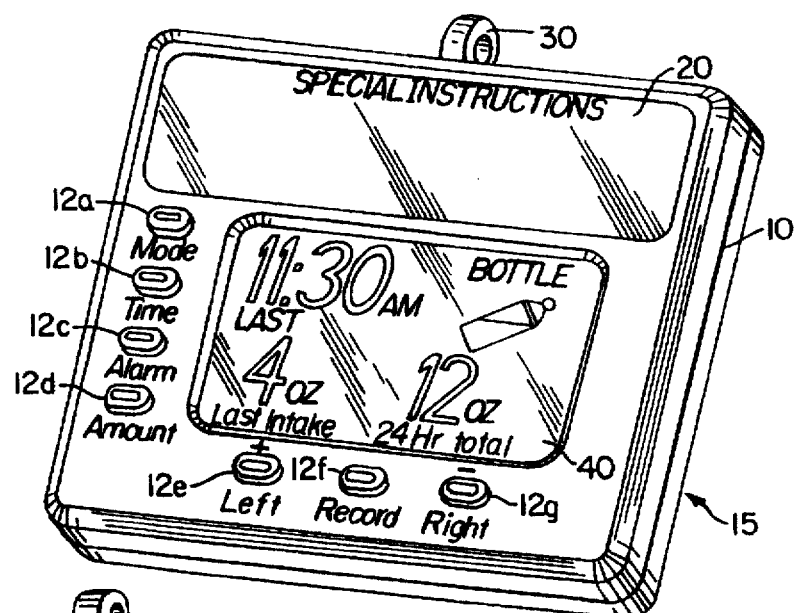
FIG. 1 is a perspective view of a care giver medical data collection and reminder device.

Referring to FIG. 1, a care giver data collection and reminder device (CDCR) 15 is housed in housing 10. The housing 10 is constructed of plastic. Preferably, the plastic is to be durable and child safe. Special instructions for the care giver can be placed in holder 20 of housing 10. This holder 20 is constructed to allow a card or paper to stay within its confines. A lip or tangs (not shown in detail) may be used to facilitate holding special instructions within the holder 20.

A fastening device 30 is molded to housing 10. A chain, string, or the like can be attached to fastening device 30, allowing a care giver the flexibility to either place the device around their neck or wrist. Further, with older children or specially challenged persons, the CDCR 15 can be secured to the person receiving the care. In some situations, a safety pin may be the best solution for securing the device.

CDCR 15 is shown with data entry buttons 12a–12g. These buttons form an elementary keyboard for the care giver to use to enter and retrieve data from the CDCR 15. These buttons 12a–12g are constructed of pliable soft material. They are constructed to provide enough resistance so that a person pressing a button knows that the button was pressed sufficiently. In the present embodiment, only seven buttons are shown; however, if needed, a larger number of functions may be added.

Data entry buttons 12a–12g have a number of functions. Button 12a provides the operator with a mode selection. This toggles the various modes of operation (i.e. bottle feeding, breast feeding, medication, bowel movement, etc.) for the operator of the CDCR 15. Button 12b allows the operator to select or set time information. Button 12c is used to select or set alarm functions. Button 12d provides for entering an amount. The amount entered can relate to feeding, liquids, medicines or other biological functions. Buttons 12e and 12g provide for at least two functions each. Functions of Left and Right represents the left and right breasts, and "+" and "−" are assigned to buttons 12e and 12g respectively, to increase and decrease functions. Button 12f provides the operator with a record function. The record function stores information into memory. The exact functions of buttons 12a–12g will become apparent further in this disclosure.

Display device 40 provides operator with information pertaining to the child being monitored. FIG. 1 shows the CDRC 15 in the bottle feeding mode displaying various information. This information may include times of importance to the care of the child, biological functions of the child, amounts of liquids consumed, data entered by the operator and the like. The present embodiment uses an LCD display, though other displays capable of displaying alphanumeric, graphical and international symbols could also be used. Currently, the LCD display provides the least current and voltage draw to the circuit and is capable of being smaller in size. Further, the microcontroller 200 (FIG. 4) contains an on-chip LCD driver circuit, thereby reducing the number of parts required to implement the present invention. Various active and passive displays are becoming more viable for these types of applications. Therefore, alternate embodiments can include color displays.

Figure 2:
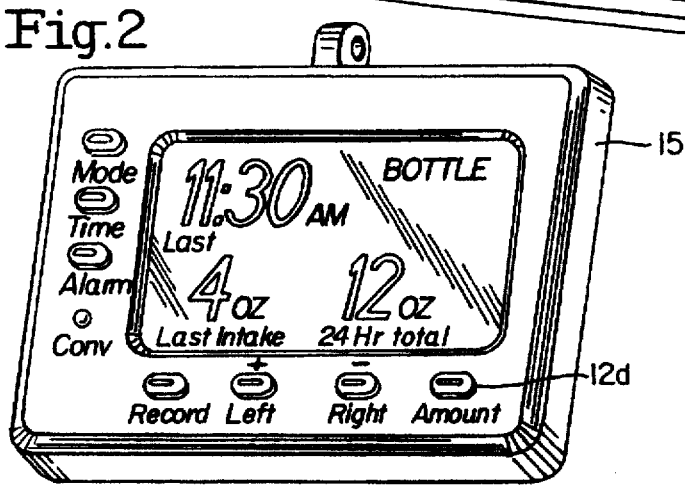
FIG. 2 is a perspective view of a child care giver medical data collection and reminder system and related carrier.
Figure 3:
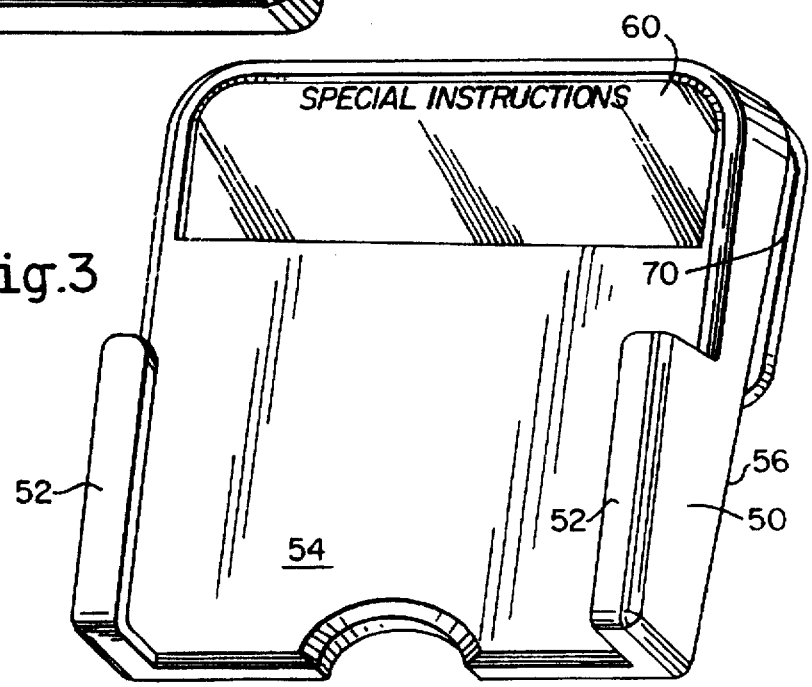
FIG. 3 is a perspective view of a carrier for the present invention.
Figure 3A:
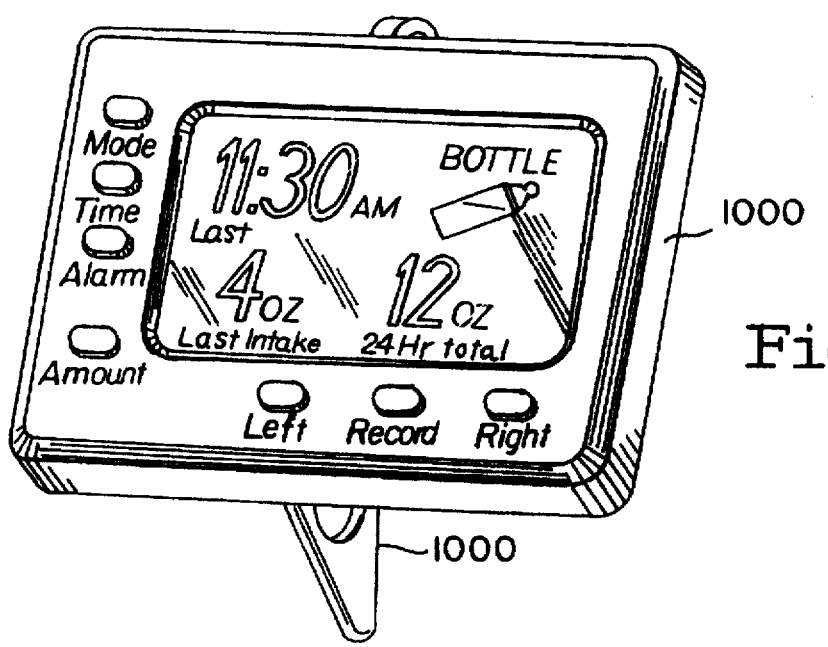
Figure 3B:
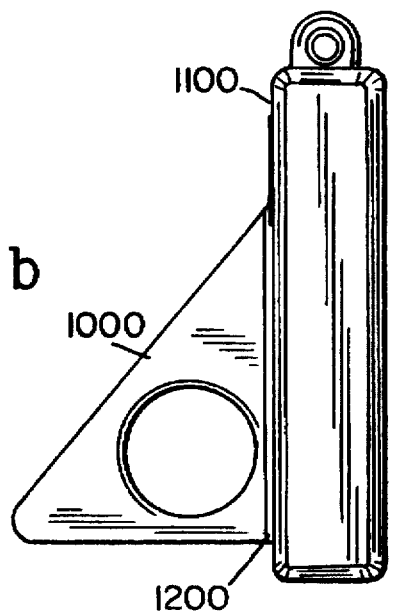
Figure 3C:
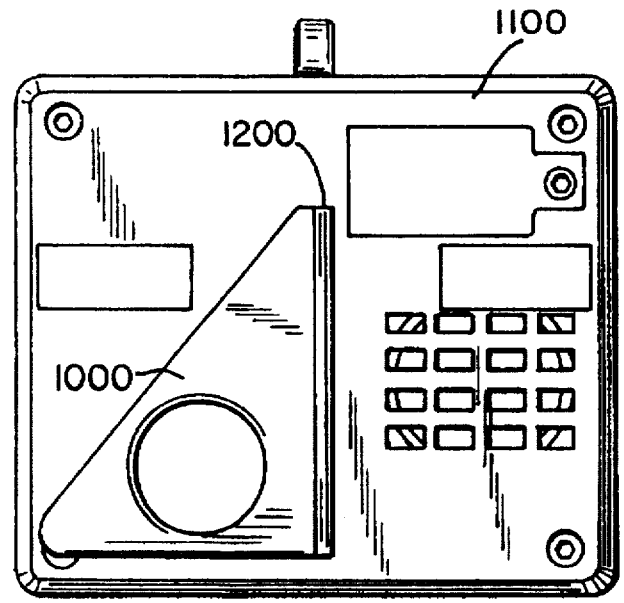

Turning to FIG. 2 and FIG. 3, CDCR 15 is shown within case 50. CDCR 15 is shown without the special instruction holder 20. Alternatively, case 50 incorporates this feature in holder 60. Holder 60 provides for a larger area for information pertaining to the child and is constructed as holder 20. Providing a case 15 with a larger holder 60 gives the care giver the option of having information pertaining to different children, different instructions for different areas of care or multiple sets of instructions. Therefore, in situations where care is provided in three different locations, only one CDRC 15 is needed and can be moved from location to location, having a case located at each site.

Case 50 is constructed of plastics that are durable and child safe. Lips 52 are provided on either side of a front-side 54 to provide retention of CDCR 15. CDCR 15 is easily slipped into the space provided between lips 52 and front-side 54. Lips 52 are tapered gradually toward front-side 54 to help secure CDCR 15 within case 50. There is an open area between the two lips 52 so that the CDCR 15 can be used while in case 50. Backside 56 is constructed with a securing clip 70. Securing clip 70 allows the care giver the option of securing CDCR 15 to clothing, baskets, cribs etc. Further, securing clip 70 or backside 54 of case 50 can be constructed with a magnetic material combined therewith. This allows the care giver the ability to secure CDRC 15 and case 50 onto a refrigerator or any metallic surface.

Housing 10, FIG. 1, and case 50, FIGS. 2 and 3a–3c, shows an alternate embodiment providing an easel support member 1000. Easel 1000 will allow the care giver a means by which to vertically support CDCR 15 on a horizontal surface (not shown). Backside 1100 of housing 10 or case 50 are constructed with a folding hinge 1200 to allow the easel 1000 to be folded into or out from backside 1100. Outer surface 1200 can be coated with a magnetic material to provide easel 1000 with a dual function.

Figure 4:
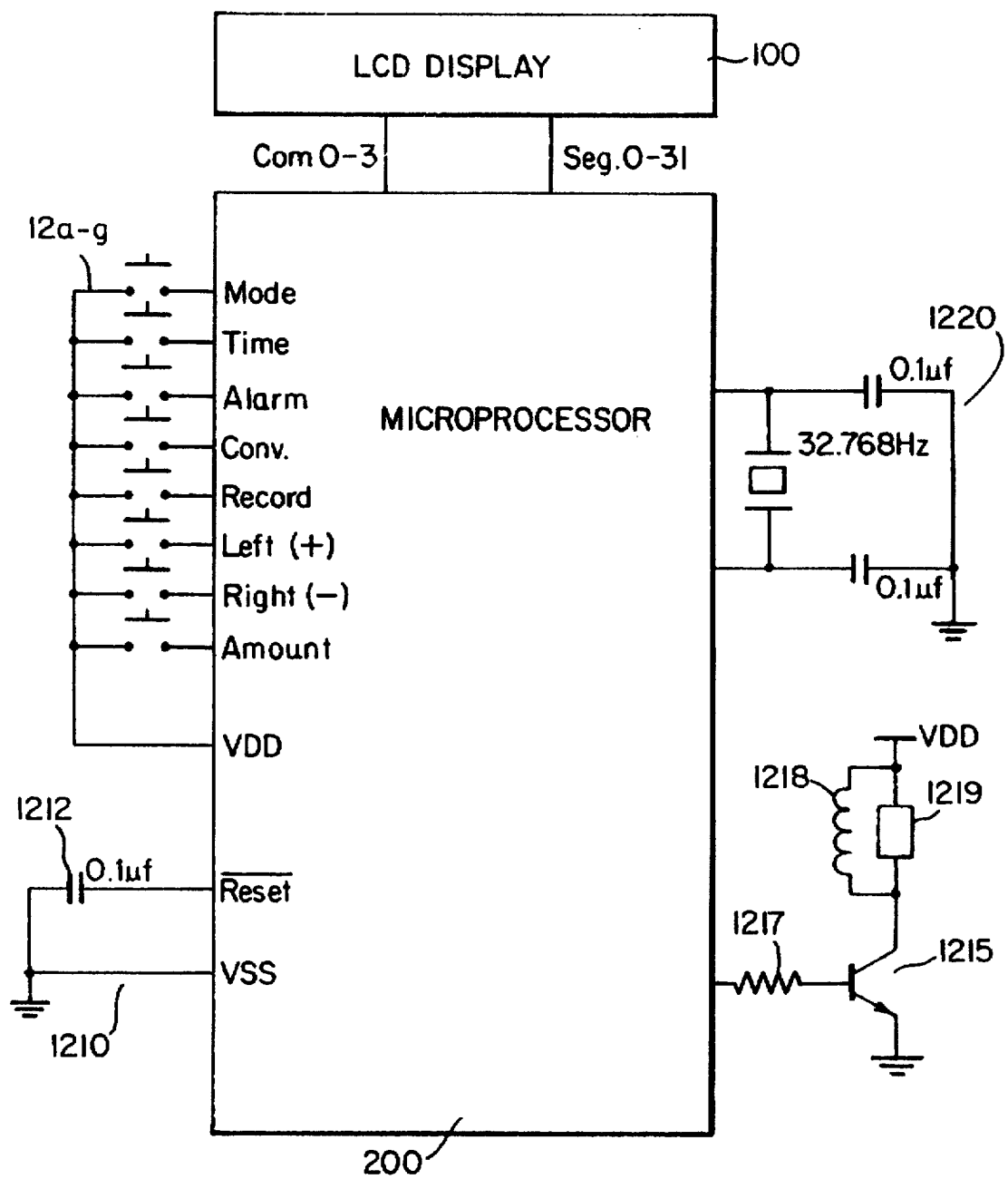
FIG. 4 is a schematic block diagram of the present invention.

Referring to FIG. 4, the internal schematic construction of CDCR 15 is shown. Microprocessor 200 is interconnected to hardware as is described subsequently in this disclosure. In the present embodiment, microprocessor 200 is a microcontroller. Microcontrollers are different from straight microprocessors in a number of ways. Microcontrollers incorporate RAM, ROM and decoding circuitry that is usually implemented outside the microprocessor chip package. This provides for simpler designs, reduced parts (external) and reduced space. In the case of the present invention, these attributes allow the current invention to be compact and easier to use. Microprocessor 200 is a KS56C220 chip made by Samsung. KS56C220 is an advanced function 4-bit single chip microcontroller that integrates ROM, work RAM, I/O ports, timers, and LCD driver into one chip. Alternate designs can be constructed using a number of other microcontrollers. The 68HC11 made by Motorola and T29 made by Toshiba, provide for similar functions. LCD display 100 was chosen for the current embodiment since this chip includes the extra advantage of an onboard LCD driver. However, if a display, such as an active matrix or miniature CRT was used, the designer could use the 68HC11 or the like. Further, in embodiments in which the number of functions and the complexity of operations are increased, the use of a different microcontroller would be necessitated.

Memory is interconnected with the microcontroller or microprocessor as temporary or permanent storage. Temporary storage is used to store timed event information or data from microprocessor 200. The information or data is readable and writable from and to the temporary memory. RAM is disclosed herein as the temporary memory; however, other storage devices can be implemented. In the alternative, a hard drive or similar read/writable device can be used. ROM is a read only memory, and is discussed herein as a generic term of art as the permanent storage, in alternate embodiments of EPROM, PLA or FLASH can be used. Permanent storage contains the instructional routines and data for microprocessor 200 to function as an event timer, track chronological data and provide appropriate input and output functions.

Microprocessor 200 uses a crystal clock oscillator 220 to provide timing for functions within. Reset' on the microprocessor 200 is set to a ground state with a de-coupling capacitor 1212 set at value of 0.1 µF. An auditory alarm circuit 1215 is shown connected to microprocessor 200. This is a simple buzzer circuit using a buzzer 1219 in parallel with a coil 1218 connected between the collector of transistor 214 and Vdd. Transistor 1214 base is driven through resistor 217 by the microprocessor 200. The emitter of transistor 1214 is connected to ground. This circuit can be replaced with a speaker circuit to provide basic auditory sounds. Further, the use of speech circuits is known in combination with sounding circuits. Therefore, in certain situations it should be recognized that a simple voice sounding circuit can be used in place of the buzzer. Examples of these types of circuits are found in U.S. Pat. Nos. 5,253,228 issued to Truett and 4,867,442 issued to Mathews. Truett discloses an event timer with voice/speech circuitry as an audible alarm feature. Matthews discloses a physical exercise aid with voice/speech circuitry as an audible alarm feature.

Data entry buttons 12a–g, are connected to the microprocessor 200 in a manner so as to provide a positive signal upon actuation of any one of the buttons 12a–g. If any button 12a–g is actuated by a care giver, a high signal will appear on the respective input line to microprocessor 200. In the alternative, a touch entry system may include touch pads, capacitive, inductive, resistive and optical devices. The use of buttons is disclosed in the current embodiment and should not be limited to such.

LCD display 100 is connected to microprocessor 200 through lines indicated in FIG. 4 as Com 0–3 and Seg. 0–31. As was discussed before, this is one type of display. The LCD wiring as shown is for the current processor 200 and related LCD 100 and internal LCD driver circuit. Displays providing intelligible information, yet having a small size, can also be implemented. A flat panel matrix can be used as an alternate to LCD 100. The main concerns regarding display 40 or display 100 is the ability to display alphanumeric data and icons in a cost effective fashion. The use of icons or graphical information in response to input data or information and output data or information is important. The operator needs to have these graphical functions in order to effectively understand the needs of the child and what responses are needed. Further, graphical information and international symbols will give the operation of CDCR 15 greater flexibility. Display 40 or Display 100 can be black and white or contrasting colors. The information needs to be displayed in a visible manner so that the care giver (operator) can properly use the CDCR 15.

The CDCR 15 is powered by two LR-44 (3.0 V) or the like, alkaline button cells. Small rechargeable cells can also be used. A built in sleeping routine is programmed into the CDCR. In the sleep mode, only the clock time is shown on display 100. Wake-up is initiated by pressing MODE button 12a once during the sleep cycle.

Figure 5:
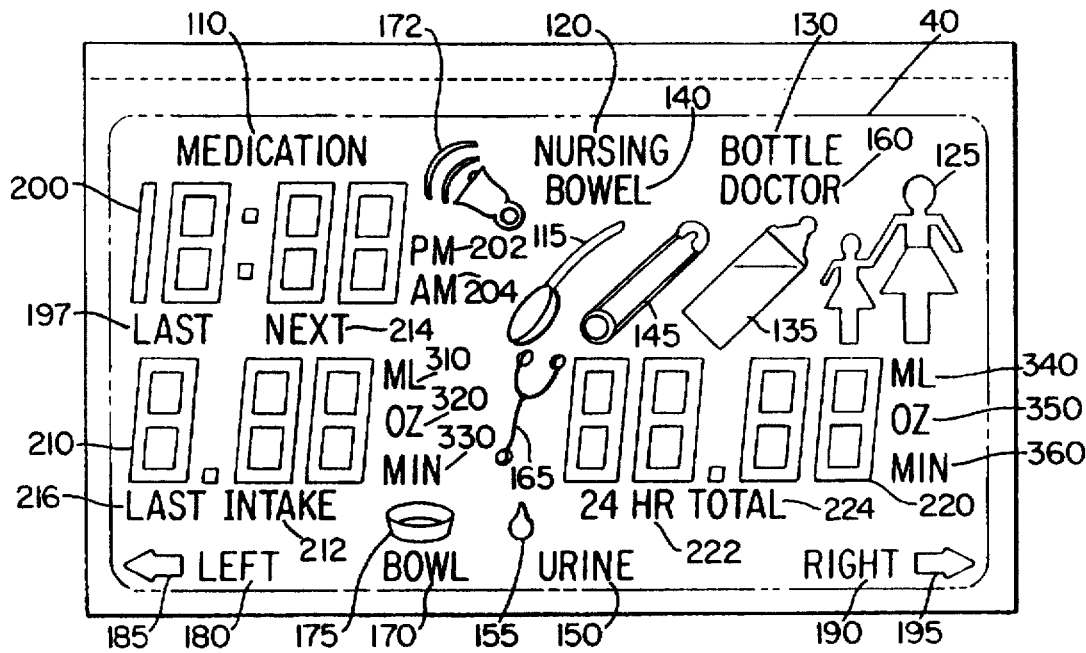
FIG. 5 depicts a LCD display of the present invention.

Now turning to FIG. 5, display 40 is shown with various segments. Display 40 is shown as a LCD display, as disclosed in FIG. 4. and related discussion regarding LCD 100. The purpose for two different designations is that LCD 100 is a specific embodiment and display 40 can be any type of display, provided that it meets the criteria as disclosed herein. Care giver's (operator) attention is captured using indicators, which can be auditory or visual in nature, and which helps remind and initiate responses. Icon symbols allow people with hearing disabilities to use the current invention effectively.

The icon symbols representing various possible indicators are shown in FIG. 5. LCD 100 provides a number of specific areas. Medication 110, Nursing 120, Bottle 130, Bowel 140, Urine 150, Doctor 160, Bowl 170, LEFT 180 and RIGHT 190 are alpha character words that are activated during specific functions and alarm states. Icon symbols showing equivalent functions and alarms states are shown as spoon 115, mother and child 125, bottle 135, diaper pin 145, droplet 155, stethoscope 165 and bowl 175. The icons are designed to allow almost any person to understand the needs of the child. Icon bell 172 is provided to indicate an alarm state. The alpha-characters LEFT 180 and RIGHT 190 are illuminated during nursing modes. These characters designate which breast was the last fed on and which breast is the next to provide nourishment. Icon equivalents are shown as arrow 185 (left) and arrow 195 (right). Alpha-characters forming the words LAST 197 indicating the last event. This may relate to the last time or the last amount recorded or both.

Numerical information is provided with segments 200, 210 and 220. Numeric display 200 provides timing information pertaining to the last and the next time an event has occurred or is scheduled to occur and is implemented with "PM" and "AM" indicators 202 and 204, respectively. Numeric display 210 provides information relating to current changes in time or consumption (intake). This allows the care giver the most current data/information regarding time for medication taken, bottle feeding, solid foods, bowel movement, urination, doctor's appointment, and similar events. Indicator 224 shows the care giver that the CDCR 15 is in a TOTAL mode. Indicator 212 designates INTAKE. Indicator 214 designates NEXT. Indicator 197 designates LAST for the time of the event. Indicator 216 designates LAST amount. Numeric display 220 provides information relating to 24 hour events, total accumulated over the past 24 hours, i.e. events, amounts, and current information. Indicator 222 shows the care giver that the CDCR 15 is in a 24 HR mode.

Mode selection button 12h provides the operator with the ability to select an international mode of operation. When the international mode is selected, all amounts are set to international units. Conversion from ounce to milliliters occur and CDRC 15 records all data in international units. Indicators 210 and 220 are provided with indicators 310 and 340 for indicating "ML" (milliliter) or international mode of operation, respectively. Mode button 12h is pressed in combination with either the 12e or 12g to initiate a toggle between U.S. 320, 350 and international indicators 310, 340. In an alternative embodiment, a single additional button can be used to implement this function.

FIG. 6–12 show various modes of operations for CDCR 15 as depicted with LCD 100. The following are descriptions of a number of the operations and functions available with the CDCR. Information entered by the operator will be stored within the memory located with microprocessor 200. These modes of operation are shown and explained using the display 100 in combination with microprocessor 200 and buttons 12a–12f.

Time is set in CDCR 15 in the following manner. The operator pushes TIME button 12b one time. Numerical display 210 shows the time (i.e. 12:00 AM). The time is set by pressing TIME button 12b twice and then using either "+" or "−" buttons 12e, 12g to increase or decrease the hours. The hours segment of numerical display 210 blinks during this function. Pressing TIME 12b three times in combination with buttons 12e, 12g sets the minutes. The minutes segments of numerical display 210 blinks during this function. Pressing TIME 12b four times in combination with buttons 12e, 12g sets either AM or PM. Indicators 202 and 204 alternatively illuminate until the RECORD button 12f is pressed. Pressing the RECORD button 12f sets the time and numerical display 210 and related indicator 202 or 204 illuminate showing the current time. The default setting for time is 12:00 AM.

CDCR 15 alarm function is set using the following steps. Pressing ALARM button 12c one time starts setting the alarm conditions. Pressing ALARM button 12c twice in combination with buttons 12e,12g sets the hours for the alarm condition. Pressing ALARM button 12c three times in combination with buttons 12e, 12g sets the minutes. Pressing ALARM button 12c four times in combination with buttons 12e, 12g sets either AM or PM. Numerical display 210 and indicators 202 and 204 blink on and off during setting functions relative to hours, minutes or AM/PM selection by the operator. Pressing RECORD button 12f then sets the alarm and displays the next alarm time with numerical display 210 and indicators 202 or 204 (i.e. 2:30 PM) and icon 172. Though the alarm function is primarily for feeding and medication modes, alternate embodiments may use this function for doctor's appointments and related conditions when the care giver is in need of reminding. In alternate embodiments, the steps disclosed above can be implemented with regard to date information as well. A combination of entries provides the operator the flexibility of entering a date so that multiple days of information can be stored and tracked.

Figure 6:
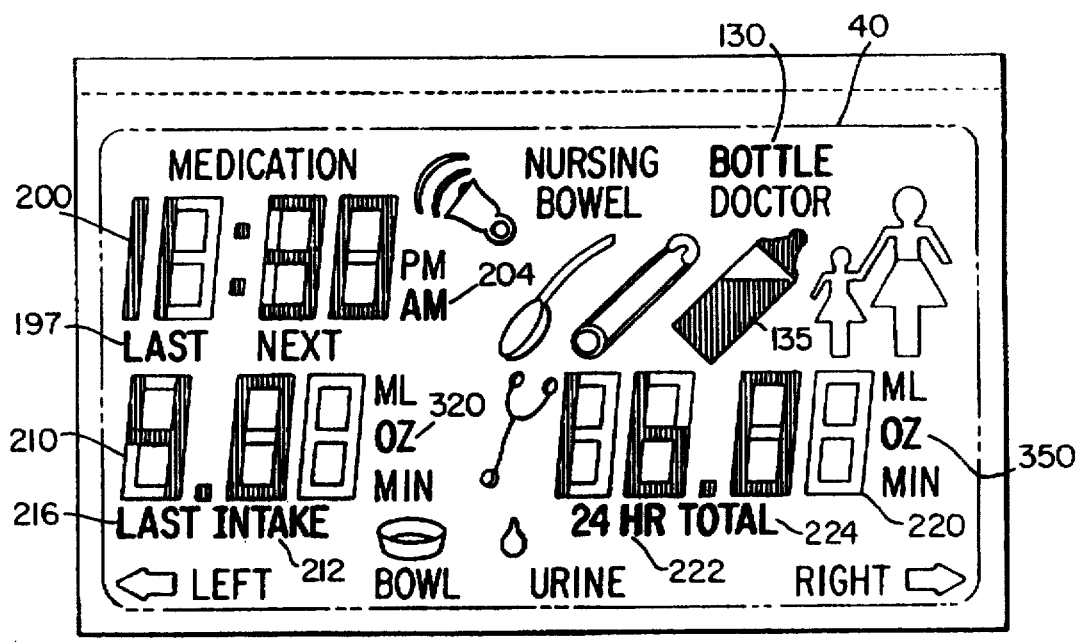
FIG. 6 depicts areas illuminated for bottle feeding display mode.

CDCR 15 in the bottle feeding mode displays information as shown in FIG. 6. Programming operations are stored and executed within microprocessor 200. An operator (parent, care giver etc.) first pushes the MODE button 12a one time. Display 40 displays a bottle 130, and displays time of last feeding, amount of last feeding and amount fed over past 24 hours. LAST 197 is illuminated and the time is displayed with numerical display 200 and indicators 202,204 (i.e.. 11:30 AM). AMOUNT button 12d is pressed and the display shows INTAKE 212. The "+" and "−" buttons 12e, 12g are pressed to increment or decrement the amount of fluid consumed by amounts of 0.5 oz (this may be changed in the software). Numeric display 210 blinks the information pertaining to the amount of fluid consumed. Pressing the RECORD button 12f then sets the amount of consumption and numerical display 220 shows the amount consumed in the last 24 hours (i.e. 16 oz.). The display will simultaneously illuminate indicators 222 (24 HR) and 224 (TOTAL). ALARM button 12c is pressed three times to set the alarm. The NEXT 214 indicator is illuminated and numerical display 210 shows the next time for feeding (i.e. 2:30).

Figure 7:
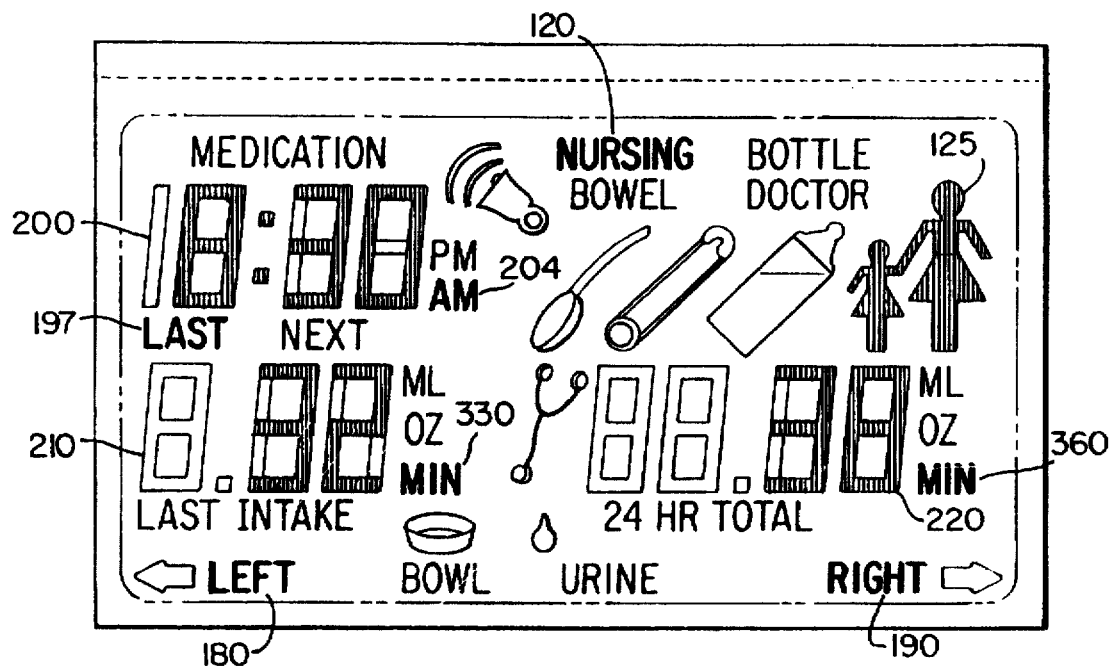
FIG. 7 depicts areas illuminated for nursing display mode.

The nursing mode displays information as shown in FIG. 7. The operation of this mode is as follows:

Pressing MODE button 12a twice places CDCR 15 into the nursing mode. NURSING 120 and the icon of mother and child 125 are illuminated. Pressing the RECORD button 12f set last feeding time. Numerical display 200 shows the last time (i.e. 11:30) nursing occurred. LAST 197 is illuminated. Pressing "+" button 12e starts the stop watch function for the left breast, and the LEFT 180 and icon arrow 185 are illuminated. Pressing the record button 12f stops the stopwatch function for the left breast. Pressing "−" button 12g starts the stop watch function for the right breast and RIGHT 190 and icon arrow 195 are illuminated. Pressing "−" button 12g a second time stops stop the watch function for the right breast. Pressing record button 12f stops the stop-watch function for the right breast. Numerical displays 210 and 220 are used to display the related times of feeding for the left and right breast, respectively. Indicators 330 and 360 are illuminated to designate minutes. LEFT 180 and RIGHT 190 words are illuminated to during both breast feedings. In alternative embodiments, the blinking on and off of the icons can be used to accentuate the mode of operation.

Many times, mothers will extract breast milk for the care giver to feed the child during the day. The nursing mode can also be used to help remind the mother of which breast was last used. Further, this mode of operation in connection with the bottle feeding mode of operation helps both the mother and a care giver keep track of feedings and nursing schedules. The combined functions greatly improve the CDCR 15 use.

Figure 8:
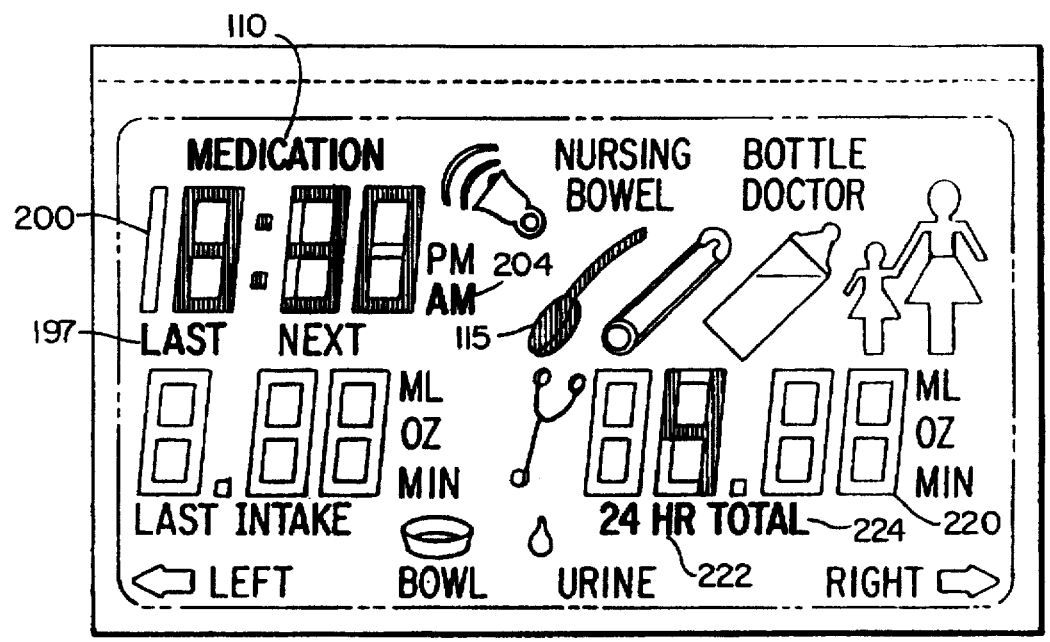
FIG. 8 depicts areas illuminated for medication display mode.

FIG. 8. shows information relating to the medication mode. Pressing MODE 12a three times sets the CDCR 15 into the medication mode of operation. MEDICATION 110 and icon spoon 115 are illuminated. Pressing RECORD 12f sets present medication time and displays the 24 hr. total number of doses. Numeric display 200 shows the last time the medication was administered. Numeric display 220 shows the total number of doses in a 24 hour period. 24 HR 222 and TOTAL 224 indicators are illuminated. Pressing ALARM 12c sets the alarm function. NEXT 214 is also illuminated. The time set for the next administering of medicine is displayed on numerical display 200.

Figure 9:
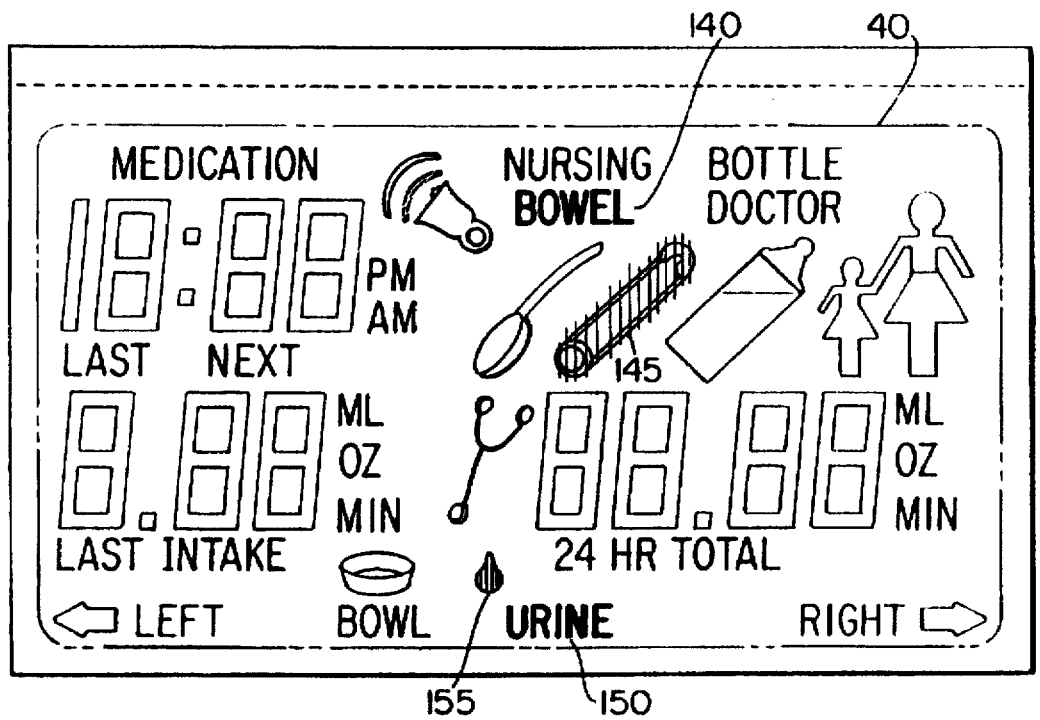
FIG. 9 depicts areas illuminated for urine void and bowel movement display mode.

FIG. 9 shows information related to the bowel movement mode. Pressing MODE button 12a four times sets CDCR 15 into the bowel movement mode of operation. BOWEL 140 and icon diaper pin 175 are displayed. Pressing RECORD 12f sets the present bowel movement time and provides display of the number of bowel movements over the past 24 hours.

FIG. 9 shows information relating to the urine voiding mode. Pressing MODE button 12a five times sets CDCR 15 into the urine voiding mode of operation. URINE 150 and icon drip 155 are displayed. Pressing RECORD 12f sets the present urine voiding time and provides display information as disclosed in the medication mode.

Figure 10:
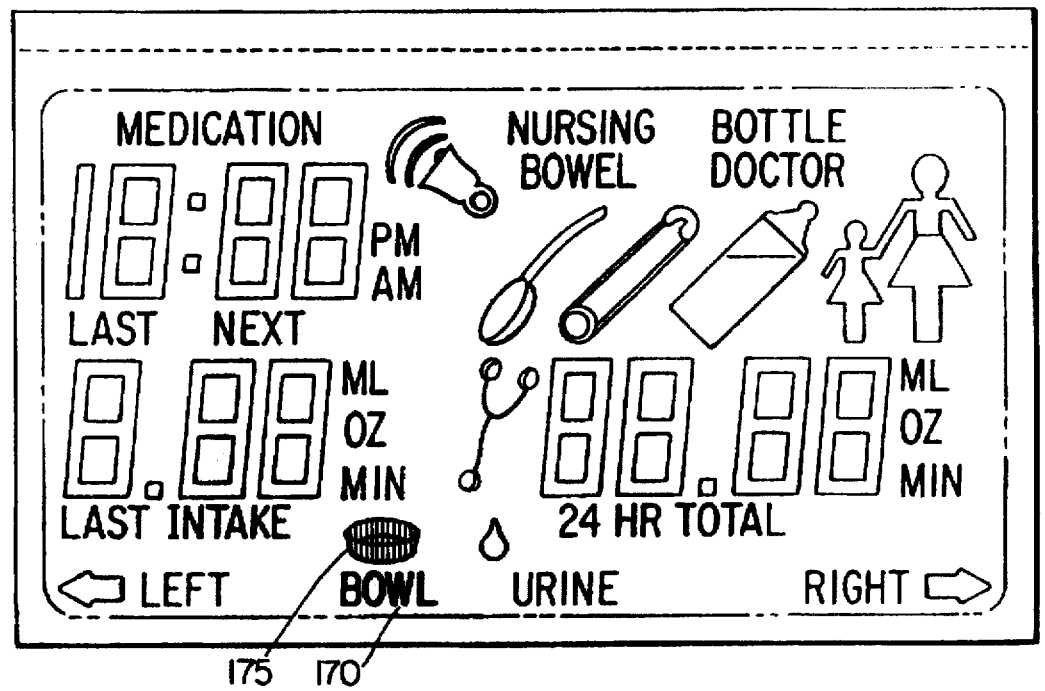
FIG. 10 depicts areas illuminated for solid food display mode.

FIG. 10 shows information relating to the solid food mode. Pressing MODE button 12a six times sets CDCR 15 into the solid food mode of operation. BOWL 170 and icon bowl 175 are displayed. Pressing RECORD 12f sets the present feeding time and provides display information as disclosed in the medication mode. Pressing the AMOUNT button 12d sets the amount of food consumed and is implemented as disclosed in the bottle mode of operation. ALARM setting steps may be followed as needed.

Figure 11:
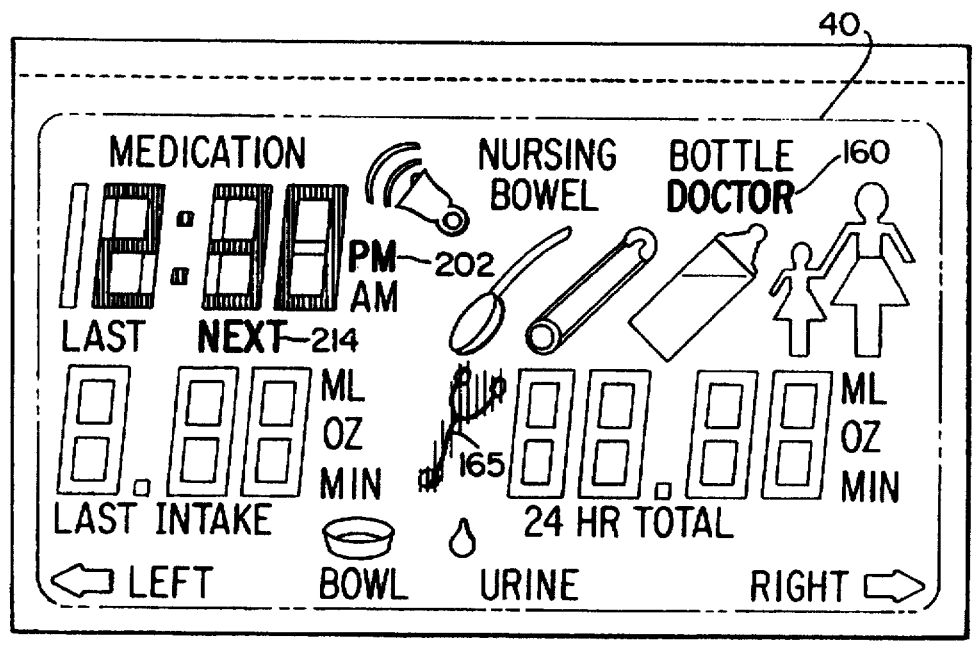
FIG. 11 depicts areas illuminated for doctor's appointment mode.

FIG. 11 shows information relating to the doctors mode. Pressing MODE button 12 seven times sets CDCR 15 into the doctor appointment mode. Like the last three modes of operation this uses the steps of recording the time of the appointment and displaying the last time of an appointment. The operator has the option of setting the alarm for the next appointment and tracking the number of appointments (similar to medication dosages). In the alternate, wherein the dates are included, a number of times and dates can be entered.

Figure 12:
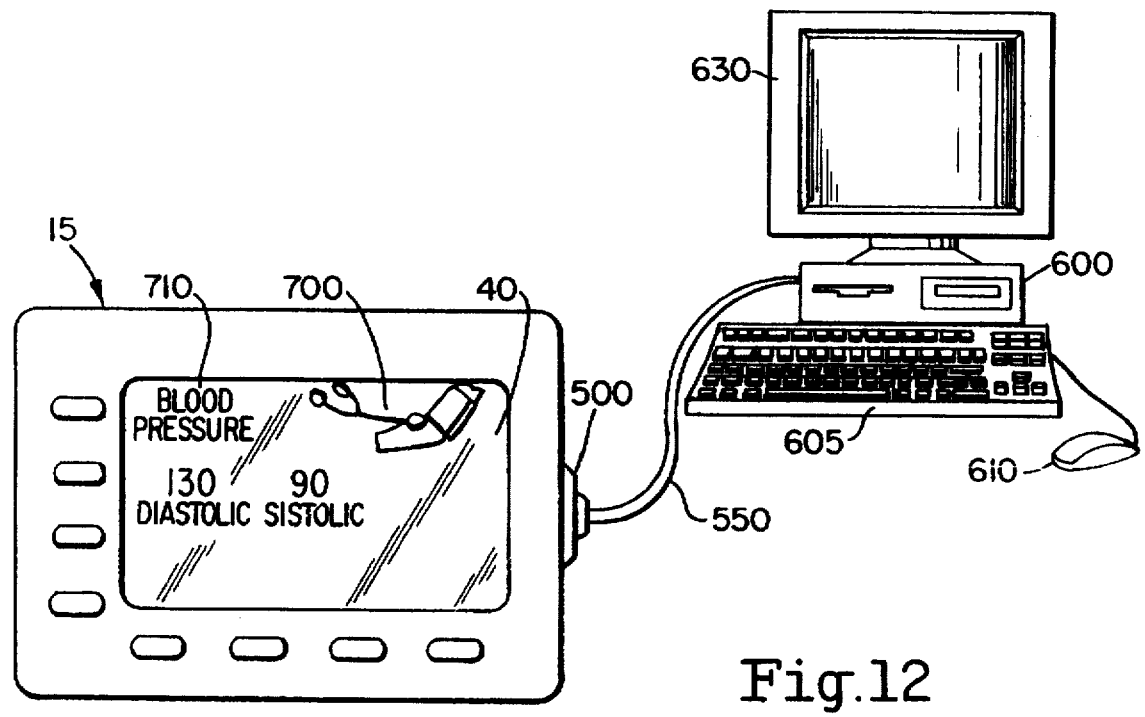
FIG. 12 is a perspective view of the present invention interfaced to a personal computer.

FIG. 12 shows an another embodiment, wherein a non-specific display device 40 is implemented allowing for scrolled data and icons formed within a matrix. Icons and information relating to those icons can be changed to provide more flexibility. For example, if a care giver or doctor would like to store messages containing textual data, a space or portion within display 40 or LCD display 100 can be provided to allow textual information to be displayed. A mode would allow textual data to be stored within and retrieved from the CDCR 15, either through a data interface to a computer or a data interface to a keyboard. Similar devices have been implemented in U.S. Pat. No. 5,495,961 (Maestre). Maestre discloses a system that is similar to the present invention; however, the Maestre system can not perform the overall functions and provide for the needs of the care giver as does the present invention. Therefore, it is incorporated to show that devices have been designed to allow alpha-numeric information to be entered/retrieved into an event timer through an interface.

Monitor 630 is attached to computer 600. A keyboard 605 and mouse 610 are connected as input devices. This computer can be located at the doctor's office, hospital or parent's home. The current invention can be initially programmed at the factory and reprogrammed at a number of these locations, if desired. Though the owner usually will never need to reprogram the CDCR 15, such a feature provides flexibility. Further, the same interface 500 allows the CDCR 15 user to download information to doctors, hospitals and parents. The file structure is a simple ASCII file with hard returns. Various other file structures can be implemented depending on the end user's needs. The CDCR 15 can be programmed to provide only the information needed by the doctor, such as, for example, the medication schedule, feeding schedule, bowl movements, and related biofunctions. CDCR 15 can download and store the information in computer 600 for use on site. Alternatively, data can be printed using a printer cable attached to connector 500. The operator uses MODE button 12a and toggles to the printing mode. A menu can be used to allow the operator to select which data is to be printed. After a selection is made, a simple text dump will occur, providing the care giver, parent, doctor or the like with a hard copy of the information.

A number of computers can be used to provide uploading/downloading of information. IBM PC (and clones) and Apple products can be used to perform the uploading/downloading of information. RS-232 and parallel connections are easily adapted to the present invention and can be used to transfer information. ETHERNET AND APPLE-TALK interfaces can be implemented with the current invention.

Though a simple cable 550 is shown in FIG. 13 as the communication link, many different links are becoming more available. New data, information, icons or instructions can be uploaded off a wired or wireless communications port connection. Telephones, cellular and satellite communication links can be used to provide communications between CDCR 15 and a data source/sink. CDCR 15 could be docked with a cellular, telephonic or like communications port. Further, case 50 (FIG. 2) can include this docking feature. Alternatively, the use of an internal communication port could be adapted to a number of communications mediums. The internal port could increase the size marginally, and yet reduce the number of external devices. Global Positioning Systems, cellular and digital communications devices have been developed for very small packages (pager or watch sized). This technology can be adapted to function with the present invention.

Data entry buttons 12a–g can be used instead of an external keyboard. In this embodiment the data buttons 12a–g will provide the care giver the ability to scroll alpha-characters until appropriate informational combinations are accepted. This can include special instructions for care, apgar scores, birth weight, growth chart information, etc. This embodiment is more specific to cases where an active matrix or miniature CRT is incorporated to display data. The amount of memory for these extra functions can be minimized using simple encoding schemes and the size of the device will be increased in only a negligible fashion, if at all. The microcontroller 200 can be replaced with a 68HC11 and 68HC24 chip set or an ASIC designed specifically for new features. ASIC designs have improved to the point whereby they are replacing a number of microprocessor based applications by reducing the space required and adding improved functions and performance.

Flexibility is provided though a simple user interface and easy method of installing new data into the CDCR 15. Tables are set up providing icon equivalent to alpha-numeric characters. A set of input instructions relating to each mode of operation is set to a pairing of icons and alpha-numeric characters. If a doctor or care giver would like to track new data, such as blood pressure, the CDCR 15 is inserted into a docking station interface 500 (depicted simply with an interface cable 550) and uploaded with the new icons and equivalent alphanumeric information. Blood pressure icon 700 is uploaded to the CDCR 15 through interface 500 along with alpha-characters "BP" 710. Information and related software is uploaded to allow new functions and related inputs and outputs to be executed with CDCR 15. The program information, data and related icons and words can be set out in a script like language to execute pre-installed routines. Examples of these pre-installed routines are: ALARM, RECORD, TIME, INCREASE/DECREASE, MODE, and AMOUNT. Some or all of these functions are used when storing information for care givers.

An operator removes the CDCR 15 from interface 500 to use as disclosed in the first embodiment. The diastolic and systolic values will be entered by the care giver via data entry buttons 12a–g. Related data is displayed on display 40 showing the new icon for blood pressure and the "BP" characters. RECORD mode of operation will be used so that data values of the diastolic, systolic and pulse will be stored in memory. The numerical data is displayed within a given area of display 40 representing blood pressure and pulse. The data relating to the child's blood pressure would be stored and retrieved as data relating to any other biological function of the child. TIME routines can be used to set the time measured and last time measured. ALARM routines can be used to provide an alarm condition for the next time the child's blood pressure and pulse are to be taken. Incrementing and discriminating information is handled with the same routines as are used in the AMOUNT routine.

Various modes of carrying out the invention are contemplated as being within the scope of the following claims particularly pointing out and distinctly claiming the subject matter which is regarded as the invention. Further, while the invention has been described in terms of several embodiments, it is contemplated that it may be practiced with modifications within the spirit and scope of the appended claims.

We claim:

1. A programmable infant data collection and reminder apparatus within a housing, comprising:

a microprocessor connected to a temporary storage device and a permanent storage device, said temporary storage device provided to store data from an operator actuated data entry device and to store data resultants from program operations performed with said microprocessor and said permanent storage device provided with said program operations from said microprocessor to track time events;

said data entry device connected to said microprocessor providing mode selection and event data from timed events;

a display connected to said microprocessor providing icon representations and interrelated alpha-numeric information associated with individual mode selections;

said mode selections are associated with specific time events and specific icons and alpha-numeric information for each of said timed events selected;

an indicator connected to said microprocessor provided for output alarm conditions simultaneously with said icons and alpha-numeric information;

said data entry device having a mode selection input, whereby said operator actuation of said mode selection input in incremental steps sets said microprocessor into specific modes of operation;

said data entry device having a time selection input, whereby said operator actuation of said time selection input incrementally sets time operation within said microprocessor and said temporary memory;

said data entry device having an alarm selection input, whereby said operator actuation of said alarm selection input incrementally sets alarm operation events within said microprocessor and said temporary memory;

said data entry device having an amount selection input, whereby said operator actuation of said amount selection input sets an amount within said temporary memory;

said data entry device having a record selection input, whereby said operator actuation of said record selection input in single increments records a value into said temporary memory;

said data entry device having an input for incrementing and an input for decrementing, said incrementing input further functioning as a left breast input and said decrementing input further functioning as a right breast input; said event data depends upon said mode selection settings, whereby said mode selection for said timed events relates to care needs of an infant.

2. The apparatus of claim 1, wherein said mode selection inputs are selected from among breast feeding, bottle feeding, urine and bowel functions, medication administering, conversion and physiological operations, and combinations thereof, said microprocessor interconnected with said temporary and permanent memory and said data entry device, and said program is in operation with said microprocessor to accept data from said data entry device and provide data to said display device.

3. The apparatus of claim 1, wherein said microprocessor is a microcontroller.

4. The apparatus of claim 1, wherein said display is a flat panel matrix capable of producing graphical information.

5. The apparatus of claim 4, wherein said display is designed to produce said icons to represent universal symbols for said needs of said infant.

6. The apparatus of claim 4, wherein said display is designed to provide said alpha-numeric characters with international symbols.

7. The apparatus of claim 1, wherein said data entry device is an operator actuatable input for setting specific times of said events for each of said selectable modes of operation with a touch sensitive device.

8. The apparatus of claim 1, wherein said information further includes chronological data for timed events and measurable amounts for said infant.

9. The apparatus of claim 1, wherein said microprocessor is an ASIC.

10. The apparatus of claim 1, wherein said temporary storage device is read/writable memory and said permanent storage device is read only memory or erasable read only memory or flash memory.

11. The apparatus of claim 1, further having a retaining area to secure instructions in a visible manner.

12. The apparatus of claim 1, further comprising a fastener and a support device, said support device having a hingable vertical easel.

13. The apparatus of claim 1, further comprising a communications port provided to interface with an external device, said external device capable of displaying said information in an intelligible format so at to allow for the downloading of said information.

14. A method of operation for a programmable infant data collection and reminder apparatus comprising the steps of:

entering information through a data entry device by an operator for selecting a specific mode of operation and entering information associated to said specific mode;

controlling said associated information pertaining to an infant that has been entered through said entry device with a microcontroller;

manipulating said associated information regarding said infant and providing reminders pertaining to specific events relating to said infant and said operator entered mode selection with said microcontroller;

providing said reminders through a display to said operator;

providing graphical representations of associated information for each of said reminders, said associated information provided as alpha-numeric information;

timing events with said microcontroller and keeping tack of next and previous events depending upon said operator entered mode selections and said associated information pertaining to an infant;

providing information through an indicator and simultaneously displaying said graphical representations and alpha-numeric information;

displaying in a simultaneous manner said graphical representations and said alpha-numeric information; and representing information pertaining to physiological functions and medical needs of said infant with both graphical representation and said alpha-numeric information specific to said operator entered mode selection and said associated information.

15. The method of claim 14, whereby said indicating device provides an auditory sounding.

16. The method of claim 15, whereby said auditory sounding produces intelligible information.

17. The method of claim 14, whereby said displaying of graphical representations are shown as icons and international symbols, said displaying of graphical and alpha-numeric information is generated in either black and white or contrasting colors, and is provided in a manner so as to capturing the attention of the operator and providing a signal so that the operator can enter new data or act upon said information.

18. The method of claim 14, further comprising the step of communicating with an external device.

19. The method of claim 18, further comprising the step of downloading information or data to said external device.

20. The method of claim 19, further comprising the step of uploading information or data from said external device.

* * * * *